(12) United States Patent
Ellis

(10) Patent No.: US 8,119,290 B2
(45) Date of Patent: Feb. 21, 2012

(54) ELECTRODE AND MANUFACTURING METHODS

(75) Inventor: Keith Ellis, Nottingham (GB)

(73) Assignee: Atraverda Limited, Abertillery (GB)

( * ) Notice: Subject to any disclaimer, the term of this patent is extended or adjusted under 35 U.S.C. 154(b) by 0 days.

(21) Appl. No.: 11/912,005

(22) PCT Filed: Apr. 26, 2006

(86) PCT No.: PCT/GB2006/001504
§ 371 (c)(1),
(2), (4) Date: Jan. 23, 2008

(87) PCT Pub. No.: WO2006/114605
PCT Pub. Date: Nov. 2, 2006

(65) Prior Publication Data
US 2008/0193850 A1    Aug. 14, 2008

(30) Foreign Application Priority Data
Apr. 27, 2005    (GB) .................................... 0509753.0

(51) Int. Cl.
*H01M 4/72*    (2006.01)
*B05D 5/12*    (2006.01)

(52) U.S. Cl. .......................................... 429/234; 427/77
(58) Field of Classification Search .................. 429/234
See application file for complete search history.

(56) References Cited

U.S. PATENT DOCUMENTS

| | | | |
|---|---|---|---|
| 3,813,300 A | 5/1974 | Shima | |
| 3,901,731 A | 8/1975 | Warzawski | |
| 3,941,615 A | 3/1976 | McDowall | |
| 4,125,680 A | 11/1978 | Shropshire | |
| 4,331,747 A | 5/1982 | Julian | |
| 4,608,144 A * | 8/1986 | Darwent ...................... 204/257 |
| 4,900,643 A | 2/1990 | Eskra | |
| 5,045,170 A | 9/1991 | Bullock | |
| 5,114,547 A | 5/1992 | Ullman | |
| 5,126,218 A | 6/1992 | Clarke | |
| 5,232,797 A | 8/1993 | Moulton | |
| 5,281,496 A | 1/1994 | Clarke | |
| 5,688,615 A | 11/1997 | Mrotek | |
| 5,993,494 A * | 11/1999 | Malikayil ................... 29/623.5 |
| 2003/0162087 A1 | 8/2003 | Clarke | |
| 2004/0072074 A1* | 4/2004 | Partington ................. 429/231.5 |

FOREIGN PATENT DOCUMENTS

| | | |
|---|---|---|
| EP | 0415896 A1 | 3/1991 |
| EP | 0552126 | 7/1993 |
| EP | 552126 | 7/1993 |
| EP | 0630066 | 12/1994 |
| EP | 630066 | 12/1994 |
| GB | 2281741 | 3/1995 |
| JP | 59075579 | 4/1984 |
| JP | 07073871 A | 3/1995 |
| JP | 11073947 A | 3/1999 |
| RU | 2052543 C1 | 1/1996 |
| RU | 2133070 C1 | 7/1999 |
| WO | 0243176 | 5/2002 |
| WO | 02058174 | 7/2002 |
| WO | 2005120792 | 12/2005 |

* cited by examiner

*Primary Examiner* — Patrick Ryan
*Assistant Examiner* — Brent Thomas
(74) *Attorney, Agent, or Firm* — Caesar, Rivise, Bernstein, Cohen & Pokotilow, Ltd.

(57) ABSTRACT

An electrode (30) comprises a plate (31) having a major surface to which there has been attached an initially separate raised pattern (32) for guiding application of and/or retaining electrolyte paste adjacent the plate (31).

7 Claims, 5 Drawing Sheets

ELECTRODE AND MANUFACTURING METHODS

BACKGROUND OF THE INVENTION

The invention relates to electrodes for use in an electrochemical cell or battery, for example a bipolar lead-acid battery.

It is known to make bipolar plate electrodes for this purpose from lead and lead alloys. Ideally the electrodes are very thin to reduce the size and weight of the battery but thin sheets of lead metal and lead alloys are difficult to seal around the edges. A reliable seal is required in bipolar batteries to prevent conductive paths of electrolyte being formed from one side of the bipolar plate to the other, which would cause self discharge of the battery. The plate electrodes are not entirely resistant to galvanic corrosion which generally results in through-plate porosity in the form of pinholes (and the electrodes are heavy if manufactured in greater thickness to overcome this problem). Proposals to reduce the effective weight of the lead include the use of porous ceramics with lead infiltrated into the pores (which need to be of fairly thick section to be mechanically robust, and are thereby still rather heavy); and the use of glass fibres and flakes coated with lead, lead alloy, or doped tin oxide, or lead oxides as conductive particulate in a thermoplastic resin matrix but such electrodes are complex and expensive to produce. Carbon based materials have been tried, but most forms are susceptible to electrochemical oxidation.

Plates made exclusively of the Magneli phase suboxides of titanium (of the general formula $Ti_nO_{2n-1}$ (where n is an integer greater than 4 or greater) satisfy many of the criteria above. However, they are expensive to make, are brittle, and do not easily accept surface features, for example to accept and retain the battery paste coating.

We realized that plates can be made from the Magneli titanium suboxide material in particulate form in a suitable polymeric matrix, most, if not all, of these weaknesses can be overcome.

SUMMARY OF THE INVENTION

According to the invention, there is provided an electrode comprising a plate having a major surface to which there has been attached, for example after the electrode plate was made, a raised pattern for guiding application of and/or retaining electrolyte paste adjacent the plate.

The electrode may comprise a shaped substantially pore-free body of hardened resin, the body having electrical paths defined by contacting particles of titanium suboxide of the formula $Ti_nO_{2n-1}$.

The particulate titanium suboxide is preferably selected to provide a high level of conductivity; $Ti_4O_7$ and $Ti_5O_9$ are preferred. Some suboxides have low conductivity and poor corrosion resistance and preferably are avoided; an example is $Ti_3O_5$. Although the particles can be provided as a mixture of the Magneli phases it is important that the presence of lower oxides such as TiO, $Ti_2O_3$, $Ti_3O_5$ is minimised and preferably entirely avoided.

It is a preferred that the particle size distribution is selected so that the particles will contact each other intimately to create electrical paths and provide conductivity. Preferably the particle size distribution is relatively narrow since this gives good electrical connectivity. Preferably the particles have a particle size distribution with a standard deviation of less than about 50% of the mean particle size. Polymodal mixtures can also be used but care must be taken to ensure that the populations of smaller particles do not reduce the electrical connectivity of the populations of larger particles.

We have found that specific particle sizes and particle size distributions are required for making electrodes of a specific thickness but a mean particle size (by volume) of around 100 to 150 micrometers is suitable for an electrode of 1 to 2 mm thickness. For making thinner electrodes, which may be preferred, smaller particles are required if the plate is to be pore free. However, if the average particle size is small it is more difficult to achieve a suitably narrow particle size distribution to give a good conductivity.

The powder is manufactured by methods such as those taught in U.S. Pat. No. 5,173,215. The manufacturing conditions are adjusted to ensure that the powder has a high proportion of the $Ti_4O_7$ and $Ti_5O_9$ crystallography (to produce high conductivity) and effectively none of the non-Magneli $Ti_3O_5$ material (which causes poor corrosion resistance and low conductivity). The precursor $TiO_2$ powder is chosen or treated to produce a Magneli phase suboxide powder with particle size distribution required for good conductivity.

The resin may be selected from a wide variety of materials. Preferred are thermoset resins. One suitable resin to manufacture a corrosion resistant plate is an uncured epoxy such as Araldite® PY307-1, in conjunction with HY3203® hardener, both materials being available from Vantico AG of Basel, Switzerland. This has been found to be particularly resistant to anodic corrosion and to make a pore free plate, although other resin systems will produce satisfactory products. Thermoset resins are particularly suitable for the manufacturing of good conductivity plates since they are handled in a hot press, which also presses the particles together for intimate electronic contact, and they also shrink somewhat on curing, further bringing the particles closer together. Other candidate thermoset resins include epoxyphenols, novolac resins, bisphenol A based epoxy resins, bisphenol F epoxy resins; polyesters (saturated, unsaturated, isophthalic, orthophthalic, neopentylglycol modified, modified vinylester, vinylester urethane and the like. Some grades of these polymers have been found to exhibit a relatively large amount of shrinkage on curing coupled with a relatively poor adhesion to the particles. This allows interconnecting voids to appear around the surfaces of the particles which makes them unsuitable for producing substantially pore-free plates. However, low shrink and other additives may be included in commercial grades of these resins, provided that they do not have a detrimental effect on the chemical stability of the resin in the acid electrolyte. Some polymers have been shown to be unstable in the polarised presence of an acid electrolyte. Some commercial resins have a mould release agent pre-blended in the mixture and these should be avoided in this application since they can adversely affect the adhesion of the active battery materials and potentially affect the corrosion stability of the plate and also the surface chemistry (surface tension etc.) of the battery acid electrolyte. The chosen resin will preferably be one which is resistant to the electrolyte acid, especially where the electrode is for bipolar batteries.

U.S. Pat. No. 5,017,446 discloses the inclusion of a wide range of conductive fillers in a thermoplastics resin. We have found that the high volume fraction of particles disclosed in U.S. Pat. No. 5,017,446 means that the finished electrode is very porous and unsuitable for use as a bipolar electrode unless great care is taken in ensuring that the particle size distribution of the particles is such as to engender a very close packing density, such as a bimodal or trimodal distribution. In addition, the matrix of 60% volume solids in a thermoplastic, which this source uses as an example has very poor flow properties even at the high melt temperatures (370° C.) cited, and would be unsuitable for injection moulding—which is the preferred mass production technique for thermoplastic materials. In order to improve both the porosity and the flow characteristics of the melt, it is necessary to significantly reduce the fraction of solid particles in the mixture to less than about 35% vol. It is clear from Table III of U.S. Pat. No. 5,017,446 that the resulting material would have a resistivity which would be unsuitable for use in a bipolar lead-acid battery where the threshold value of suitable resistivity is generally accepted to be lower than 1 Ohm.cm. In example 6, U.S. Pat. No. 5,017,446 indicates that a resistivity of 9.2 Ohm.cm was achieved which is unsuitable for use as a bipolar electrode in a lead-acid battery. The present invention is of a material which has suitable resistivity and porosity, and can be made without the need for very careful particle size management and allows a well known industrial process to manufacture.

The conductivity of the titanium suboxide particles may be improved by contact with a gas such as helium or hydrogen for a period, say up to 24 hours before being incorporated in the resin composition in manufacture of the electrode.

The relative proportions of resin and suboxide powder and the particle size distribution of the suboxide powder will affect the properties of the electrode. For example, an electrode will tend to have low conductivity if:

too high a volume proportion of resin is used; and/or
  the plate or other body shape is pressed in manufacture with too little or with uneven force; and/or
  the particle size distribution leads to low packing density; and/or
  the average particle size is too small; and/or
  the resin shrinks insufficiently on curing; and/or
  any excess resin is not ejected from the mould as flash due to either the resin curing too quickly, the viscosity of the resin being too high (either intrinsically or by virtue of the mould temperature being too low), or by the mould clearances being too small.

The electrode will tend to have unacceptable through porosity if:

too low a volume proportion of resin is used; and/or
  the particle size distribution provides a low packing density such that there is more volume of inter-particle voids which needs to be filled with resin and so the effective volume proportion of resin becomes low and/or
  the average particle size is too large; and/or
  the resin shrinks excessively in manufacture of the electrode and by virtue of poor adhesion to the particles forms cavities adjacent to and around the particles on curing; and/or
  the resin cures too slowly, is of low viscosity (either intrinsically or by virtue of the mould temperature) or the mould clearances are too large that significant amounts of resin are lost from the mould.

When manufacturing the body it is preferred to have a slight excess of a thermoset resin. In press moulding the conducting particles are pressed together to form low resistance conductive paths. Any excess resin is ejected from the mould as "flash" before the final cure of the material, which occurs in the press, under pressure, thus locking in the electrical connectivity.

Particles with high (e.g. rods, fibres) or low (e.g. flakes) aspect ratio of the titanium suboxide can also be present to increase connectivity between the electrically conductive suboxide particles in the electrode. High aspect ratio particles are especially favoured because they provide longer unbroken electrical paths, so increasing conductivity.

The plate may have the following combination of features:

is electronically conductive, i.e. an overall electrical conductivity greater than $0.5\ S.cm^{-1}$ more specifically has an orthogonal conductivity of at least about $1\ S.cm^{-1}$ which is relatively uniform across the face of the plate;
  has essentially no through porosity (which would allow ionic species to travel through the pores causing self discharge of the battery) as demonstrated by a leakage current of less than $1\ A/m^2$;
  is resistant to chemical attack by the materials in a lead-acid battery (this is primarily the acid, but also the oxidant $PbO_2$ and the reductant Pb metal);
  is resistant to galvanic corrosion (especially at the oxidation potential which occurs during recharge of the positive side of the bipolar plate);
  provides an intimate and adherent surface to the active chemicals in the battery (such as $PbO_2$, $PbSO_4$, Pb, tri-basic lead sulphate, tetra-basic lead sulphate);
  is mechanically robust in thin sections;
  does not catalyse the production of oxygen or hydrogen at the potentials which occur during the recharge of the battery;
  provides a surface to which adhesives and sealants and/or mechanical seals can be applied;
  ideally has some surface features, (such as a triangular, square, hexagonal or other tessellated pattern grid) which will allow the active paste material to be easily and uniformly spread onto the cells thus formed, and to restrict the movement of the paste during the charge and discharge cycling of the battery, and
  ideally is of low weight.

In a method of making an electrode, the method may comprise mixing an unhardened resin, a hardener therefor, and the particles of the Magneli titanium suboxide and pouring the mix into a mould therefor to form the shaped body.

The resin and hardener may be heated, the particles of titanium suboxide are added to form a dough, which is then added to a preheated mould. In another preferred method the resin components and the suboxide particles are first formed into a sheet moulding compound which can be placed uniformly in the mould because it can be handled easily.

The method may include the step of placing the mould in a heated press and applying pressure. The pressure may be about 2000 Pa and the temperature at least 35° C., preferably at least 70° C. In one embodiment the method includes the further step of removing the shaped article from the mould and cleaning the surfaces by processes such as grit blasting, applying corona discharge and plasmas, and other surface cleaning techniques.

The method may include the step of applying a battery paste to the electrode. Different amounts of paste may be applied to different areas of the electrode.

The method may include the step of first applying a thin layer of metal to the electrode before the paste is applied. The method may include applying the metal layer by electroplating and adding dispersoids to the plating solution.

The method may include the step of pressing a thin foil, say up to about 200 micron thick, of metal on to the surface of the electrode whilst in the moulding press and the resin is curing. Other methods include plasma or flame spraying, sputtering, chemical vapour deposition and the like.

Low viscosity resins are preferred to wet the external surface of the particles which will enhance low porosity say less than about 50 Pa.s at 20° C. These resins will also tend to infiltrate into the microscopic surface features of the particles to improve mechanical strength. The viscosity may be lowered by pre-heating or by selection of suitable resins. However extremely low viscosity resins should be avoided for the reasons stated above.

Coupling agents such as silanes to contact the surface of the particles may be used to improve the adhesion and wetting of the resin to the suboxide particles to enhance low porosity and high mechanical strength. The coupling and/or wetting agents (such as silanes and other surfactants) can be advantageously used on plates which do not have the metallic layer imposed. The pasting of the plates is carried out in the usual way, with conventional lead oxide paste or other lead containing pastes. The paste on the electrode can be cured in the usual way.

A battery may include an electrode as defined herein or when made by a method as defined herein.

The battery comprises a plurality of electrodes and an acid electrolyte.

With pasted and cured plates, a battery is assembled using a number of bipolar plates, appropriately oriented, and a single positive monopole at one end and a single negative monopole at the other. Absorptive glass mats can be advantageously inserted between each plate. Sealing of the plates is achieved in the laboratory by the use of gaskets of appropriate thickness and made of say butyl or silicone rubber sheet. The entire assembly is held together by metal straps and bolts of suitable length. In a commercial battery, in a preferred feature of the invention, the plates are sealed into a pre-moulded plastic container, with slots for each plate. A certain amount of compression of the glass mat and of the paste can be engendered by correct dimensioning of the container. Such compression has been found to aid the adhesion of the paste to the bipolar electrode substrate. Low concentration sulphuric acid can be added followed by a lid having grooves which will seal onto the edges of each plate, placed on the top. The lid can advantageously also contain a suitable gas pressure regulating system.

The battery is then electrically formed in the usual way. As the formation takes place, then the acid increases in strength, by the conversion of the sulphate-containing paste to $PbO_2$ on the positive plate and Pb metal on the negative. The initial strength of the sulphuric acid should be chosen to ensure that the final strength of the acid is in the range 30-40% by mass of sulphuric acid, or even higher.

Phosphoric acid can also be advantageously added in part or total replacement of the more usual sulphuric acid.

Batteries made by this method have high power and energy density ($W/m^3$, $Wh/m^3$), high specific power and energy ($W/kg$, $Wh/kg$). They have high cycle life, even in deep discharge conditions, and can be manufactured cheaply with conventional technology.

In a bipolar battery it is important for efficient discharge at high rates that the monopolar or end electrodes have excellent planar conductivity. By this invention monopolar plates can be made by substituting for one side of the mould a flat plate and then placing a metallic grid or mesh in the mould before the uncured resin and the suboxide materials are placed in the mould. When the mould is closed and the resin is cured, the metal grid or mesh will be pressed into one side of the formed electrode, giving it excellent planar conductivity for the purposes of a monopolar or end plate. Of course, the metal grid or mesh should not be exposed to the electrolyte otherwise it will corrode. Preferably metal studs are electrically attached to the metal grid or mesh to provide terminal connections. Lead or lead alloy foils can also be advantageously applied to the reverse face of the electrode in the mould instead of the metal grid or mesh to provide good planar conductivity for the monopolar or end electrodes.

Metal plates, grids or meshes may be advantageously incorporated into the bipolar plates in order to increase the planar conductivity and ensure good current distribution over the full area of the electrodes. Cooling channels can be introduced into the bipolar plates in like manner.

An electrode may be tested to confirm the absence of invisible micropores which lead to though porosity in an electrode before pasting, comprising placing the electrode in a simulated battery and measuring the flow of current over time.

A satisfactory electrode will have a current leakage of less than 1 $A/m^2$ over 28 days when tested in the apparatus of Example 2.

BRIEF DESCRIPTION OF SEVERAL VIEWS OF THE DRAWINGS

The invention will now be described by way of example only and with reference to the accompanying diagrammatic drawings, in which.

DETAILED DESCRIPTION OF THE PREFERRED EMBODIMENTS

Figure 1:
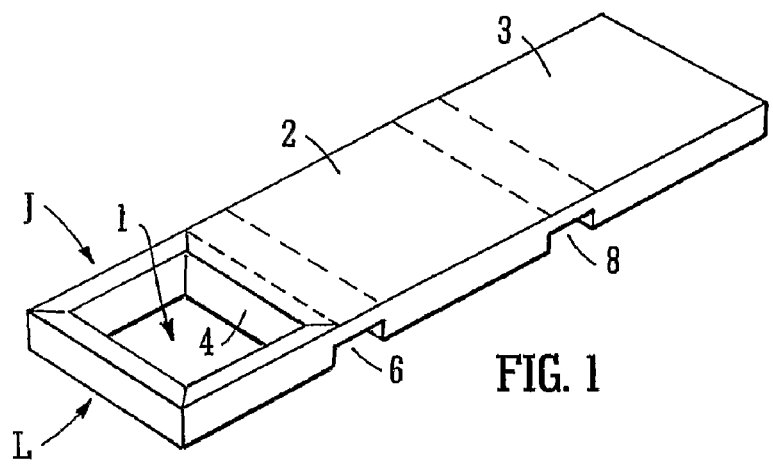
FIG. 1 is a perspective view of a three part jig useful in the invention.
Figure 2:
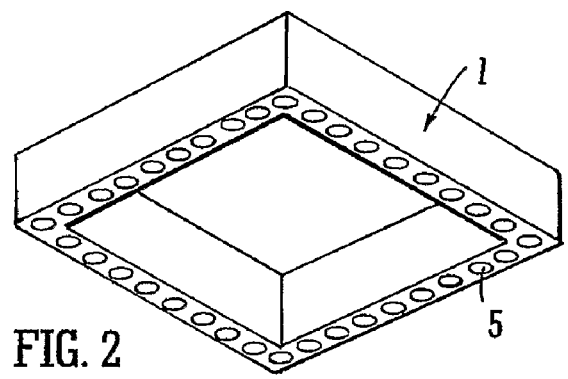
FIG. 2 shows the underside of the first part of the jig.

In order that the electrode and method may be well understood it will now be described with references to the following Examples.

Example 1

24 g of ARALDITE PY307+1 resin and 8.8 g of the HY3203 hardener were weighed out into separate containers and pre-warmed in an oven at 50° C. for a minimum of 7 minutes. These materials are available from Vantico Ltd. The materials were then thoroughly mixed together and 65 g of the Magneli suboxide powder as below is added and mixed in thoroughly to form a dough. The phase analysis of the Magneli suboxide powder was measured by X-ray diffraction as:

| | |
|---|---|
| $Ti_4O_7$ | 26% |
| $Ti_5O_9$ | 69% |
| $Ti_6O_{11}$ | 5% |

The particle size distribution was measured on a Malvern Mastersizer to be:
100 vol % below 300 micrometres 95 vol % below 150 micrometres
90 vol % below 125 micrometres
50 vol % below 85 micrometers
10 vol % below 40 micrometres The dough was evenly spread into a mould that has been pre-warmed to 75° C. Even spreading is important to achieve uniform conductivity across the face of the plate. The laboratory mould is of a "window frame" type and consists of two platens and a frame. The mould cavity has an area of 149×109 mm (0.01624 m$^2$) and will therefore produce plates of this size. The volume of dough was sufficient to produce a plate about 1.5 mm thick. Two locating pins at diagonal corners are used to locate the various parts of the mould. Spacer levers are available to re-open the mould to eject the manufactured part after moulding is completed.

The mould can be advantageously treated with an appropriate mould release agent such as Frekote 770NC®. The mould was closed and placed in a heated press at 75° C. The mould was initially pressed at 70 kN (1137 Pa) for 5 seconds and then 100 kN (1625 Pa) for 25 minutes. The mould is opened and the resulting plate is extracted. Any flashing is removed with a metal spatula.

The surface of the plate was cleaned by grit blasting, in a blast chamber such as a Gyson Formula F1200®. The blast gun was supplied with air at a pressure of 0.8 MPa. Alumina was used for the blast medium, although other blast conditions and other cleaning methods will undoubtedly produce satisfactory results. The blasting was carried out manually until the entire surface was uniformly matt grey in colour. Tests with surface impedance scanning techniques have shown that blasting in this fashion produces a plate with very uniform surface impedance. The surface of the plate may also be further modified by techniques such as corona discharge or by the application of plasmas.

A separate spacer element incorporating a grid pattern formed of non conductive and acid resistant material, such as ABS or cured epoxy resin, was then applied to both to either planar surfaces of the plate to provide raised grid on either surface. In the example, this grid covers the central 136×96 mm area of the plate. The grid of the plates did not extend to the perimeter of the plate to provide a flange for sealing. The dimensions of the grid can be changed by altering the shape of the mould, and thus different volumes of active paste material will be applied to the plates in a controlled manner.

The conductivity of the plate was then tested and was found to be in the range 1-2 S.cm$^{-1}$. In this example, the density of the final plate was around 2.2 g cm$^{-3}$. Higher pressing pressures produce higher levels of conductivity. Thus the preferred range of densities for the final product is in the range of 1.8 to 2.4 gcm$^{-3}$ or above.

The plates were pasted with active material and assembled into batteries as below. They satisfy all the criteria above.

Better results were obtained if a thin metallic layer is first applied to the planar surface of the plate prior to adhesion of the spacer. This layer can be of pure lead, or of lead alloys (with, for instance, antimony, barium, bismuth, calcium, silver, tin, tellurium) and be applied in a number of ways such as electroplating, sputtering, thermal evaporation and deposition, chemical vapour deposition, lead and lead alloy shot blasting, plasma or thermal spraying or by direct application of thin metal foils in the pressing mould. A wider variety of alloys can be considered than has previously been available to the lead-acid battery engineer, where the alloys must not only satisfy corrosion conditions, but also strength criteria and an ability to be fabricated into metallic grids. One convenient way of applying the interlayer in the laboratory is by electroplating as follows:

One side of the flanges were painted with a stopping-off lacquer such as Lacomit® from HS Walsh & Sons Ltd. The plate was then sealed with a rubber O-ring onto the bottom of a plastic plating tank with the stopped-off flange uppermost. A lead metal strip was pressed against the other side of the flange to provide an electrical connection. When plating the side which will be used as a positive, about 500 ml of a plating solution such as 27% lead/tin methane-sulphonic acid, containing a starter additive such as Circamac HS ST6703 (both materials are supplied by MacDermid Canning Ltd) was poured into the plating tank. A large pure lead anode was used as the counter electrode. On the plates of the laboratory size, a current of 0.5 A is applied for 7 hours, which deposited approximately 10 g of an alloy whose composition is approximately 6:94 tin:lead.

Plating the negative side was similar except the plating solution is lead methane-sulphonic acid (Circamac HS ST6703). A current of 0.5 A was applied for approximately 3 hours which deposits about 5 g of lead metal.

Other plating solutions such as those based of fluoroboric acid can be used. The plating process can also involve the use of inter alia "dispersoids" such as titania, to produce a rougher surface finish for better keying with the paste subsequently applied.

Adjustments to the plating current and other additives can also advantageously affect the surface morphology of the layer.

After electroplating, the plates are removed from the plating bath and washed thoroughly in deionised water. The stopping-off lacquer is removed with acetone.

Another convenient method for the application of metals is by direct application of thin metallic foils in the pressing mould. For instance, a foil of lead with two percent tin alloy, 50 μm thick, is placed in the bottom of the preheated mould and the resin and the powder mixture spread thereon. A second foil is placed over the spread material before the mould is closed and the resin is cured as above. At this stage, the metallic layer, whether applied by electroplate, direct foil pressing, plasma or flame spraying, sputtering, chemical vapour deposition, or any other method can be activated by washing it in concentrated sulphuric acid immediately prior to pasting. A particularly suitable method of forming a plate with foils is disclosed below.

In another embodiment of the invention, a lead dioxide layer or a tin dioxide (suitably doped with for instance antimony to increase the conductivity) can be applied on to the substrate by methods such as anodic electroplating, sputtering, chemical vapour deposition and like processes, either directly or after the metallic layer is applied. Such a layer is preferably applied on the positive side of a bipolar electrode.

It is well understood in the lead-acid battery industry that a certain low level of corrosion of a lead or lead alloy electrode improves the adhesion of the active paste (particularly the positive paste) to the electrode. However, in the case of an interlayer described, if the corrosion rate is too high, the interlayer can be completely consumed, especially under deep discharge or high overcharge conditions of a lead-acid battery. One aspect of the invention is to provide an interlayer with different areas, some of which are highly corrodible (which give good paste adhesion) and other areas are more corrosion resistant (which gives long life).

The method described above produces plates which are nominally flat. However, plates with simple and compound curvature and different perimeter shapes can be made by appropriate modification of the shape of the mould. When assembled into batteries, such plates will engender an appropriate shape on the finished battery to enable it to be installed more conveniently in for instance a body panel of a vehicle.

Example 2

Figure 9:
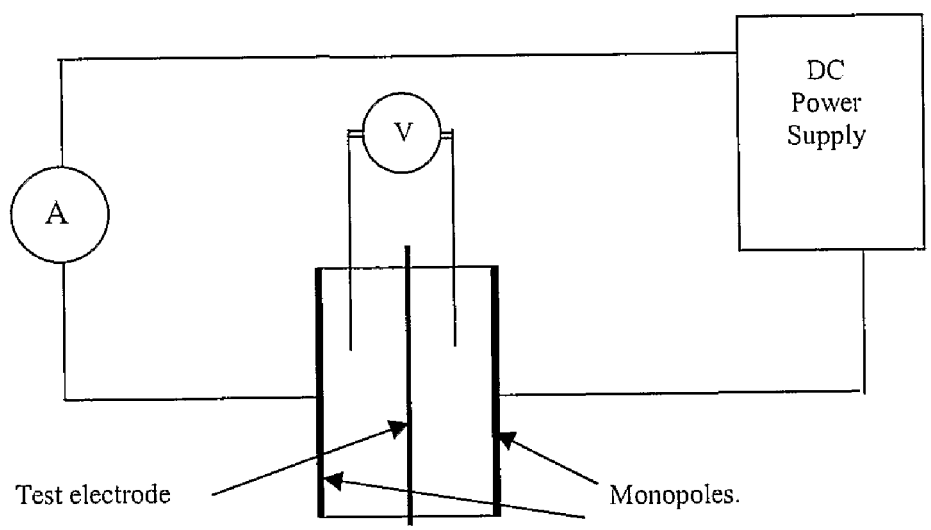
FIG. 9 is a diagram of a test cell.

Plate electrodes described were tested before the application of any metallic layer or active battery paste to confirm the absence of any invisible micropores through the plate which would allow ionic species (such as $H^+$, $OH^-$, $SO_4^{2-}$) to migrate through the plate. A suitable testing cell which simulates very closely the processes which occur in a battery is shown in the accompanying FIG. 9. The plate was assembled as if it is a bipole in a 4V cell which also contains a fully pasted, cured and charged positive monopole and a similar negative monopole. These are preferably of the conventional lead grid type. 30% sulphuric acid was placed between the plate and the monopoles in the conventional manner. A potentiostat was applied across the monopoles to hold the voltage across the test plate (measured by two identical reference electrodes in the acid either side of the test plate) to be 2.6V— which is chosen as the maximum that will be applied across a lead acid battery bipole in normal operation. The current flowing is noted.

We have found that a typical current observed initially to be about 0.3 $Am^{-2}$. This holds very constant over long periods (months) when the plate is manufactured as above with the preferred epoxy resin. With other resins, it is possible that although the current measured starts off low, it rises over a few days or weeks by several orders of magnitude. This implies that some resins are being corroded or otherwise degraded by the acid at high oxidation and reduction potentials and that ionic porosity is being created. Such a plate formulation is unsuitable for bipolar battery electrodes and means that by using the test outlined, the person skilled in the art will be able to determine which resins are best used in this invention.

The plate electrode may have a flange moulded of resin which is free of the suboxide powder. This will reduce the cost of the plate but still provide effective sealing. This is applicable to electrochemical cells in general, including bipolar lead acid batteries, to other types of batteries and to fuel cells, redox energy storage cells and the like.

The above is not restricted to conductive particles such as the titanium suboxides although these are known to be very highly corrosion resistant, when manufactured according to the teachings of U.S. Pat. No. 5,173,215 which is required for lead-acid battery electrode applications. Other conductive particles can also be used such as niobium doped titanium oxides, tungsten oxides, niobium oxides, vanadium oxides, molybdenum oxides and other transition metal oxides in both stoichiometric and non stoichiometric forms. It is an advantage that good conductivity electrodes can be made from relatively low conductivity particulate materials, or by a smaller proportion of relatively expensive particulate materials.

Also described herein is a method of manufacture and more particularly a method of speedily moulding heat curable compositions to form shaped articles.

Also described herein is a method of manufacture and more particularly a method of speedily moulding heat curable compositions to form shaped articles.

Patent application, PCT/GB02/00230, published under no. WO 02/058174 on Jul. 25, 2002, describes and claims an electrode for a battery, the electrode comprising a shaped substantially pore-free body of hardened resin and having electrical paths defined by contacting conductive particles. It is intended that by this reference the entire disclosure of this application is incorporated herein. In one embodiment the electrode is in flat form, i.e. a plate. Various methods of manufacture are disclosed, including manufacture by pressing a heat-curing or thermosetting composition in a heated mould. In one disclosed method, thin metallic foils are placed in the pressing moulds, the composition added, and a top foil applied, the mould is then closed and pressure is applied. The formed part is then ejected.

In order to maximise the rate at which such parts can be formed, it is preferred to have the mould tool operating at a high temperature to reduce the cure time. When raised to high temperatures the viscosity of the resin/hardener composition decreases in a few seconds and the composition commences to gel within a few more seconds.

Hence a rapid and convenient way of introducing the metallic foils and composition to the mould cavity is required.

A method for delivering a composition to the mould cavity such that the mould can be closed quickly in order to minimise and prevent problems arising from premature curing in a high temperature mould is described below. Also a method which relates to removing the formed article quickly to maximise the availability and productivity of the press is disclosed.

The method of making an article comprising a heat-cured composition with a metallic foil, or a non-metallic sheet on one or more faces, the method comprising:

advancing a vessel containing a heat curable composition to a heated and open mould cavity, the vessel having an open bottom, a first foil or sheet closing the open bottom of the vessel;

releasing the foil or sheet to cause the heat curable composition to locate in an open mould cavity;

optionally applying a second foil or sheet to close the container;

closing the heated mould cavity and applying pressure to form an article and allowing a period of time to cure the composition; and withdrawing a formed article from the mould.

In the method a multipart part jig for carrying out any two, three or four of the steps is used, the jig comprising a first part to provide the vessel to house the composition, and a second part to close the open top of the vessel, and a third part to withdraw the formed article from the mould.

The method is particularly suitable for forming generally planar articles, with foils or sheets applied to one or more major faces thereof.

Referring now to FIGS. 1 to 6, a jig J comprises a body made of a light metal such as aluminium, or any other material suitable for the operating temperature of around 200° C. A light material is preferred so that the jig is more easily handled by an operator or by a robotic device and having up to three parts or zones. These are a container frame 1 to receive the open container, an optional foil or sheet lid applicator 2, and an optional pick up device 3.

At a leading end L the jig comprises the open frame 1 which is fractionally smaller than the size of the cavity C of a mould M. The frame has an open bottom 4. Around the periphery of the lower side of the frame are holes 5 to which a vacuum can be applied from inside the frame. If it is required that the part is large, or the foil is heavy, extra vacuum can be applied in the centre of the frame, by having intermediate frame elements equipped with vacuum pipes present. The frame can therefore be used to pick up and carry a foil or sheet F1 on its underside. A slot 6 may be present on the underside of the jig to define space between the frame 1 and the optional lid applicator 2. The presence of the foil or sheet F1 closes the bottom opening of the frame and effectively transforms the frame into an open top container or vessel V to receive a measured aliquot of a heat curable resin and powder composition 7. The composition can be spread across the area of the frame by a doctor blade or similar, or, in the case of a reasonably free flowing powder, by shaking or vibrating, or evenly dispensed by a funnel arrangement, possibly with a wide spout being moved over the appropriate area of the container.

The foil may be made of lead or a lead alloy, nickel or nickel alloy or at least one of the foils comprises a metal from the group platinum, gold, silver, palladium, rhodium, yttrium, iridium, ruthenium, zinc, osmium, rhenium, tantalum, bismuth, antimony, tin, vanadium, cobalt, cerium, aluminium, titanium, copper, indium, or an alloy thereof. In a variation, the foil is replaced by a sheet such as paper label or a laminate of different metals, e.g. lead and copper or nickel or their alloys. In another variation the foil is replaced by a paper label. This can have several benefits, for example to measure the conductivity of the cured matrix one would not wish to have an overlying foil.

The optional lid applicator 2 also has vacuum holes, not shown, to hold a foil or sheet lid F2 on its underside and may be separated by a slot 8 from the optional pick up device 3. The lid applicator can be used to place the second foil or sheet on top of the heat curable resin composition in the mould cavity.

Optional pick-up device 3 (not shown in cross section) also is equipped with vacuum and can be advantageously used to pick up and remove any previously finished part from the mould at the start of each cycle. Other methods of ejection of the part, such as ejector pins can also be used.

Fast cavity loading proceeds as follows: a vacuum is drawn via the holes 5 in the frame 1 to draw foil or sheet F1 on to the frame 1 of the jig J. The curable composition 7 is added. The lid applicator section of the jig 2 is moved to a location where it is similarly loaded with foil or sheet F2. It is possible that both foils or sheets can be loaded before the composition is loaded into the container formed by frame 1 and foil or sheet F2.

When loaded in this way, the jig J is moved until the pick up device 3 is presented to the open and preheated cavity which contains a previously cured part, which is attached to 3, by a vacuum, following which the jig is raised vertically to remove the finished part from the mould cavity. The frame 1 having its foil or sheet F1 containing the composition is presented to and placed in or a short distance above the cavity C of the heated mould M. Guide pins, not shown, may be used to locate the frame 1 accurately, or preferably a robotic device can be programmed to hold the Jig J and ensure accurate placement. The vacuum is then released so that the foil or sheet and the heat curable composition remains in the cavity C as frame 1 is lifted vertically. Jig J is then quickly moved (to the left as shown) until the lid applicator 2, previously loaded with the second foil or sheet F2, is presented to the cavity, and its vacuum is released. The foil or sheet F2 falls on to the container V. Applicator 2 is lifted vertically, leaving the second foil or sheet F2 on top of the composition 7. The jig is moved away so that the tool housing the mould M can be closed. The time between the heat curable composition being placed in the heated cavity and the cavity being closed and pressure applied, can by this method be as short as about 3 seconds and no more than 10 seconds, ensuring that the effects of premature curing are minimised. During the closed mould period, the resin liquefies and flows to the extremities of the cavity. Preferably, some flash is formed to ensure that the cavity C is completely filled and flash pockets can be advantageously designed into the mould for this purpose. The cavity may advantageously have slightly raised resin seal structures 9 (see FIG. 4) in parts of the mould to restrict the possible flow of liquid resin over the ends of the foil or sheet during the curing.

During the curing period, the jig J can be advantageously moved to a location to deposit the previously cured part for finishing and further processing as required Frame 1 and the lid applicator 2 are then moved to a loading station and are recharged with foils or sheets and composition. When the curing time is completed, the tool is opened. Immediately the cycle then restarts again, as described above.

With a cure time of 30 seconds, and 7 seconds for loading and demoulding, it is possible for a single multiaxis robot and jig to service 4 presses and to manufacture parts at a rate of 1 per 9¼ seconds.

The grid pattern and/or peripheral spacer element can then be adhered to one or both of the planar surfaces.

Figure 3B:
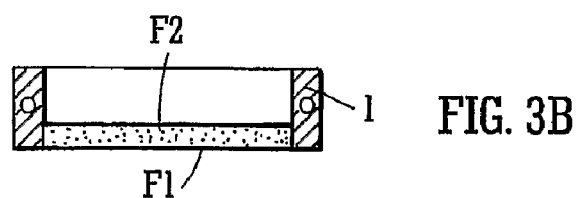
FIG. 3B shows a second embodiment of a stage of advancing an open container to a mould.
Figure 3A:
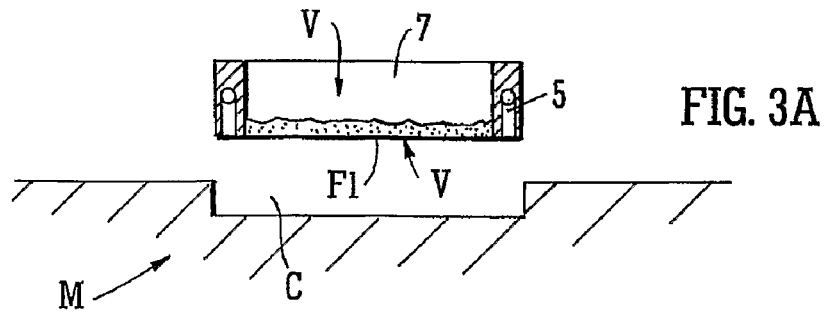
FIG. 3A shows a stage of advancing an open container to a mould.
Figure 4:
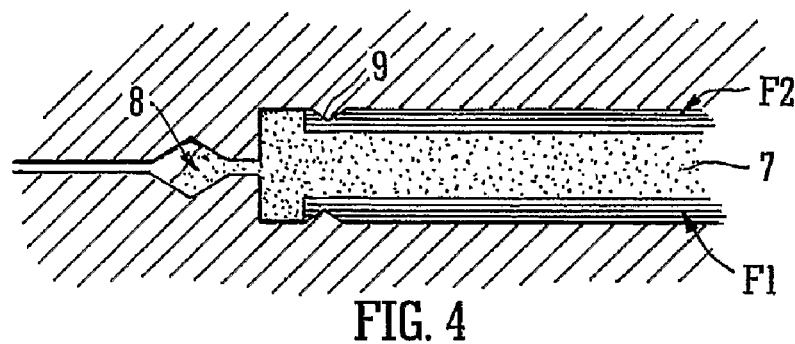
FIG. 4 is a vertical section of a mould following closure and the application of heat and pressure.

The use of this method in the invention is not limited to using the above embodiment. The parts of the jig may be separate. The foil or sheet F1 may be the same size as the cavity; in some cases, advantageously it may be smaller (e.g. several millimetres smaller) than the size of the cavity. The second foil or sheet F2 may be slightly smaller than the first foil or sheet F1, in which case the second foil or sheet F2 can be placed on top of the composition in the frame 1 as shown in FIG. 3b.

The jig J may also carry nozzles for the periodic application of mould release agent, or brushes for periodic cleaning of the mould cavity.

In another method the second foil or sheet F2 can be picked up by a vacuum system, a second part of the jig J—in a way analogous to the first foil or sheet on Part 1, but in this case there is no requirement for part 2 to consist of a frame. Part 2 (see FIG. 3) is similarly sized slightly smaller than the size of the cavity to be loaded.

In a variation a previously shaped plastic frame can also be loaded into the mould cavity by part 1 of the Jig J, in a secondary action after picking up the first foil or sheet F1. This would require an additional vacuum system to be applied, and also a con-cavity to receive the preformed plastic frame in at least one part of the mould cavity. The preformed plastic frame may contain other features such as holes and valves, which will be of importance should the finished part be utilised in a bipolar electrochemical cell or battery.

Figure 5:
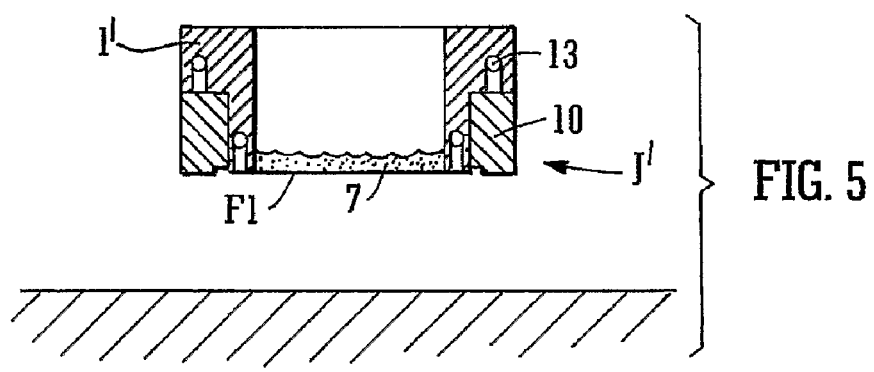
FIG. 5 shows a variation of the first part of the jig.
Figure 6:
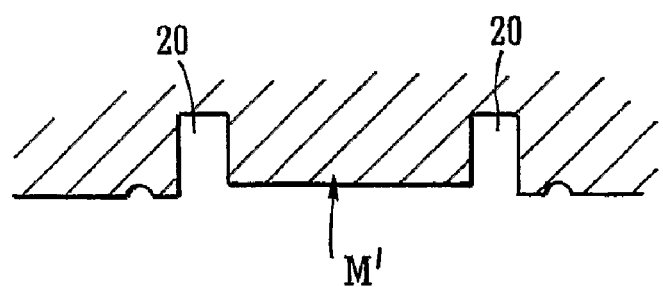
FIG. 6 is a sectional view of a mould.
Figure 7:
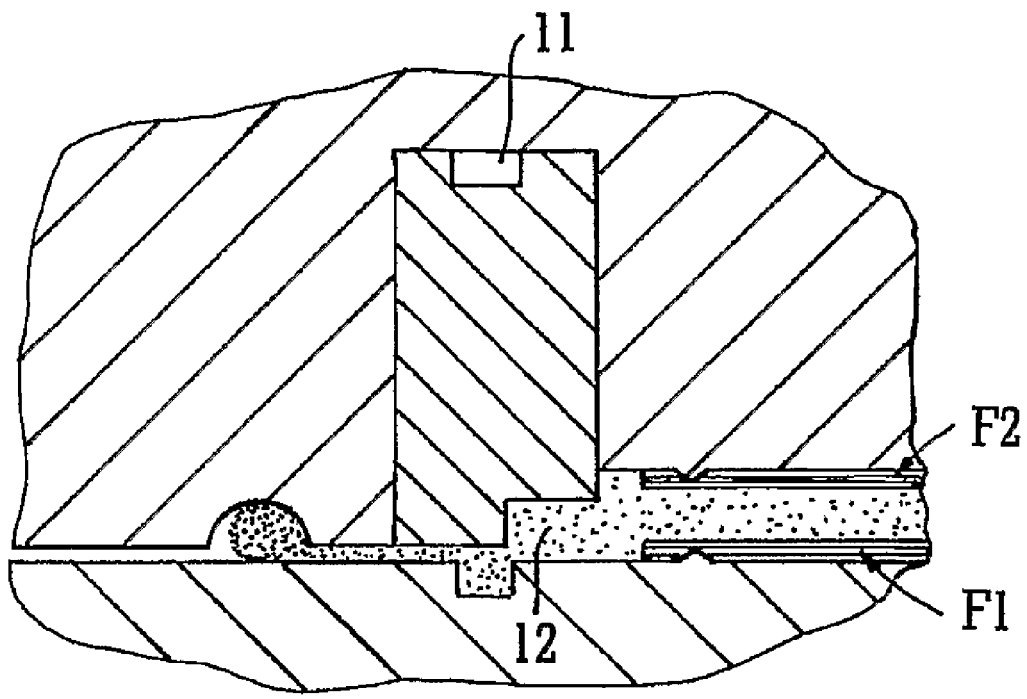
FIG. 7 is a sectional view of a mould in use.
Figure 8:
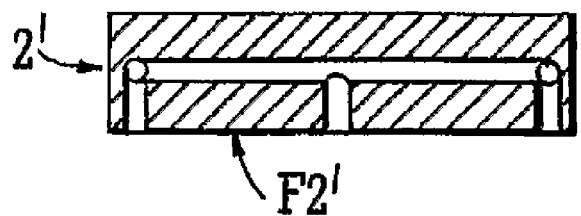
FIG. 8 is a sectional view of an embodiment of a closure port according to the invention.

FIG. 5 shows an arrangement whereby an extra vacuum system 13 is applied in part 1 of jig J to hold a preformed plastic frame part 10, When part 1 of the jig J is presented to the mould cavity as described above, both vacuums are released; depositing foil or sheet F1, the heat curable composition and the premoulded frame 10 into the cavity. After optionally placing the second foil or sheet F2, the counterpart of the mould tool is applied (FIG. 6) to close the cavity. FIG. 7 shows a detail of how the closed mould tool, the foils or sheets, the heat curable composition and the preformed frame would appear in cross section whilst the heat and pressure are being applied. FIG. 7 also illustrates an optional possibility of a tongue feature being moulded into the heat curable composition which has a counterpart groove feature in the preformed frame to facilitate assembly of a muticell electrochemical cell or battery.

Figure 10:
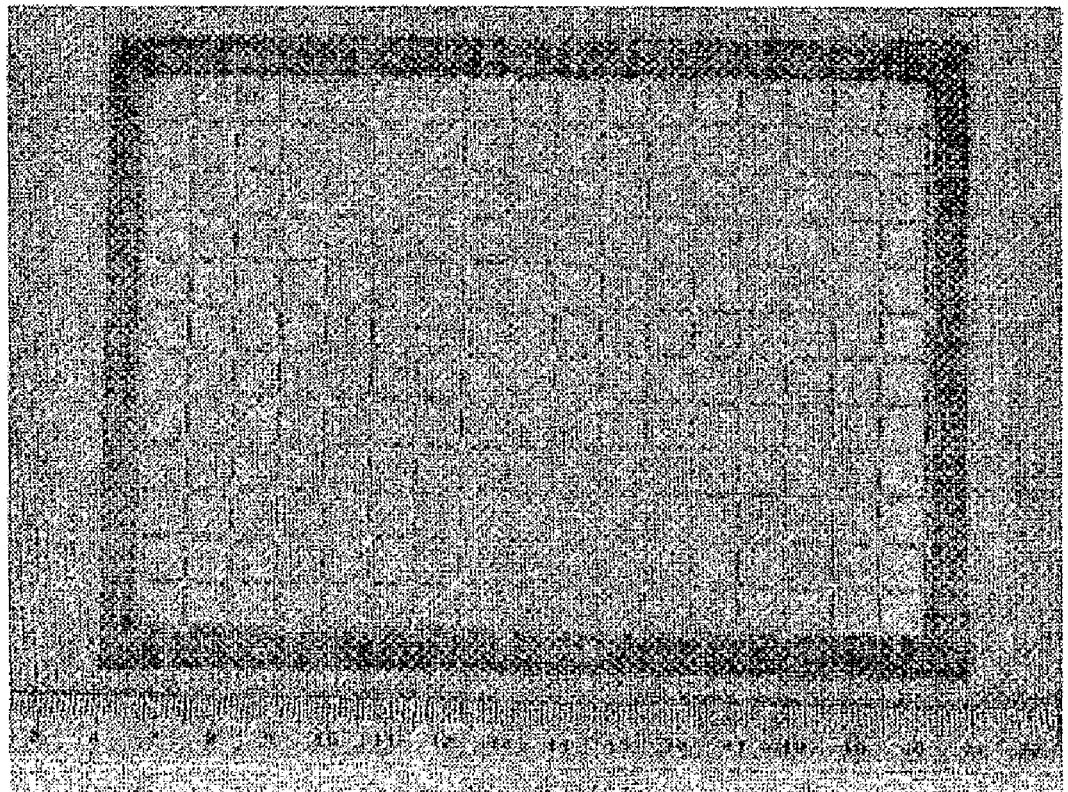
FIG. 10 is a plan view of a plate according to the invention.

In this invention, the plate is preferably formed initially as smooth "featureless" plate and subsequently fitted with a separate spacer, which may include a grid pattern. The spacer is fixed to the initially smooth plate by adhesive (e.g. epoxy resin) or other appropriate means. The spacer defines a pattern which delineates where the paste is to be applied and to help retain it in position. The grid pattern (or the like) can be applied to a plate formed by the methods herein described with reference to FIGS. 1 to 8. FIG. 10 shows a plate with a grid pattern that was formed by a moulding process for subsequent adhesion to a flat surface of a plate.

Figure 11A:
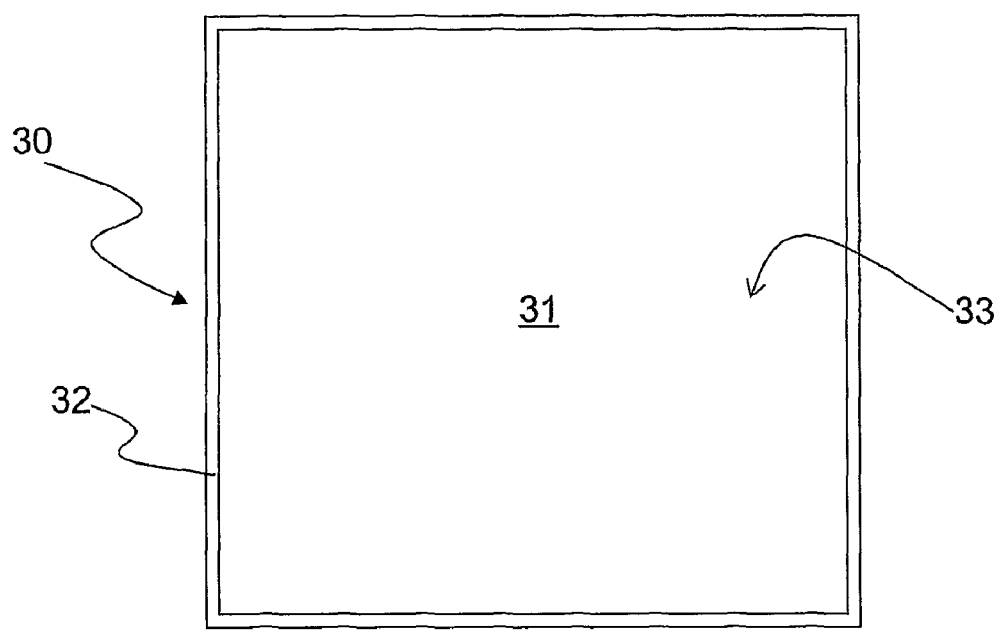
FIG. 11A is a plan view of a further plate according to the invention.
Figure 11B:
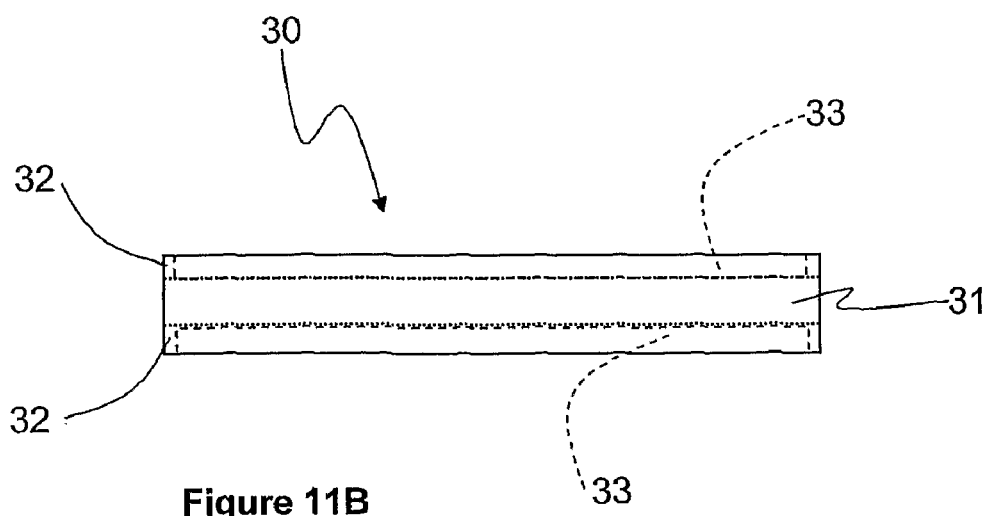
FIG. 11B is an elevation of the plate of FIG. 11A.

Referring to FIGS. 11A and 11B there is shown an electrode of the invention 30 comprising a plane featureless plate 31 formed of conductive particles (e.g. titanium suboxide) in a substrate (e.g. thermosetting resin) to major surfaces of which a metallic layer may have been applied.

In accordance with the invention a non-conductive peripheral spacer element 32 has been applied to both of the major surfaces to define a pair of rebates 33 for the retention of conductive paste.

The spacer element 32 may comprise limbs or arms to define cells as per the electrode of FIG. 10. The element 32 may be positioned inboard of the one or more of the outer edges of the major surface or surfaces of the plate 31.

The electrode 30 may have different patterns on either side, for example a grid on one side and spacer element on another.

A preferred range for the height of the spacer element 32 and/or grid is between 0.1 mm and 8 mm or even better than that between 0.3 mm and 3 mm. The height of the grid pattern shown in FIG. 10 is 1 mm. To emphasise, the invention herein includes all the features of the electrodes, plates, methods and means described earlier herein when applied in conjunction with the feature of making the plate as a "smooth" and/or featureless item and fixing to it an initially separate raised pattern, such as a spacer element or grid or like pattern.

The spacer element 32 and/or grid may be sized to allow different volumes of paste to be retained adjacent different areas of the plate 31.

The grid need not define a regular array of cells and/or need not extend over a majority of a face of the plate.

The invention includes also making a spacer element which may incorporate a grid pattern and attaching the element to the plate directly during a moulding process. The pattern shown in FIG. 10 could be made by this process and could have the same dimensions.

For example, the spacer (e.g. incorporating a grid pattern) could be formed with a metal foil attached thereto and the whole used in the method described in relation to FIGS. 1 to 8.

The shape of the pattern will be determined by the use made of the electrode. For example, if the electrode is to be used in high cycling regimes (including many discharge events) an applied grid pattern is likely to be used having a multiplicity of cells to limit the effects of the swelling and contraction of the paste.

It has also been found that the addition of a raised pattern, e.g. a spacer element, grid pattern or the like can lead to an increase in the stiffness of a featureless plate, thereby increasing robustness.

The plate may have some features provided around the periphery thereof, such as a peripheral tongue feature (as shown in FIG. 7).

Without further elaboration of the foregoing will so fully illustrate our invention that others may, by applying current or future knowledge, adapt the same for use under various conditions of service.

The invention claimed is:

1. A subassembly for use in fabricating an electrode comprising a plate having a major surface to which there has been attached an initially separate, non-conductive raised pattern free of electrolyte paste for guiding application of and/or retaining electrolyte paste adjacent the plate, the pattern extending to or towards the periphery of the major surface to leave edges of the plate exposed, said pattern including surfaces extending upwardly from a major surface of the plate and arranged to provide a plurality of cells spaced inwardly from the edges of the plate, wherein the plate is initially a smooth, generally featureless plate, and wherein the plate comprises a shaped substantially pore-free body of hardened resin and having electrical paths defined by contacting conductive particles.

2. The subassembly according to claim 1, wherein the conductive particles are titanium suboxide particles.

3. The subassembly according to claim 1, comprising a metallic interlayer between the pattern and the plate.

4. The subassembly according to claim 1, wherein the pattern comprises a lip located at or towards the periphery of one or both major surfaces of the plate.

5. The subassembly according to claim 1, wherein the pattern comprises a grid to define a plurality of cells for the application and retention of electrolytic paste.

6. The subassembly according to claim 1, wherein the non-conductive material is selected from cured epoxy resin or acrylonitrile butadiene styrene.

7. A chemical cell, battery or power cell comprising the subassembly as defined in claim 1 with the electrolyte paste included thereon.

* * * * *